United States Patent [19]
Horn et al.

[11] Patent Number: 5,732,559
[45] Date of Patent: Mar. 31, 1998

[54] ROTATIONAL RESISTANCE CRYOGENIC CONTROL SYSTEM FOR CHILLING IN A VACUUM TUMBLER OR AGITATOR BLENDER

[75] Inventors: Darrell Horn; John M. Lennox, III; Greg Tapscott, all of Rohnert Park, Calif.

[73] Assignee: Blentech Corporation, Rohnert Park, Calif.

[21] Appl. No.: 664,644

[22] Filed: Jun. 17, 1996

[51] Int. Cl.$^6$ .................................. F25C 1/00; F25C 1/18
[52] U.S. Cl. ...................... 62/62; 62/68; 62/136; 62/373; 62/342
[58] Field of Search ........................ 62/62, 63, 64, 62/68, 135, 136, 373, 342

[56] References Cited

U.S. PATENT DOCUMENTS

| | | | |
|---|---|---|---|
| 4,314,451 | 2/1982 | Leeds et al. | 62/68 |
| 4,476,686 | 10/1984 | Madsen et al. | 62/63 |
| 4,517,888 | 5/1985 | Gould | 99/472 |
| 5,104,232 | 4/1992 | Lennox, III | 366/277 |
| 5,603,567 | 2/1997 | Peacock | 366/139 |

*Primary Examiner*—Christopher Kilner
*Attorney, Agent, or Firm*—Larry D. Johnson

[57] ABSTRACT

A cryogenic control system measures rotational resistance in a cryogenic food mixing machine such as a vacuum tumbler or agitator blender to determine by test the length of time it takes from the start of chilling to reach the maximum energy level $T_{me}$, and the length of time it takes to chill the product to the desired forming point stiffness $T_f$ to establish a ratio $T_f/T_{me}$ for that product and batch size. This ratio can then be used for subsequent cycles, regardless of cryogenic flow rate, to determine the optimum product chilling point.

5 Claims, 1 Drawing Sheet

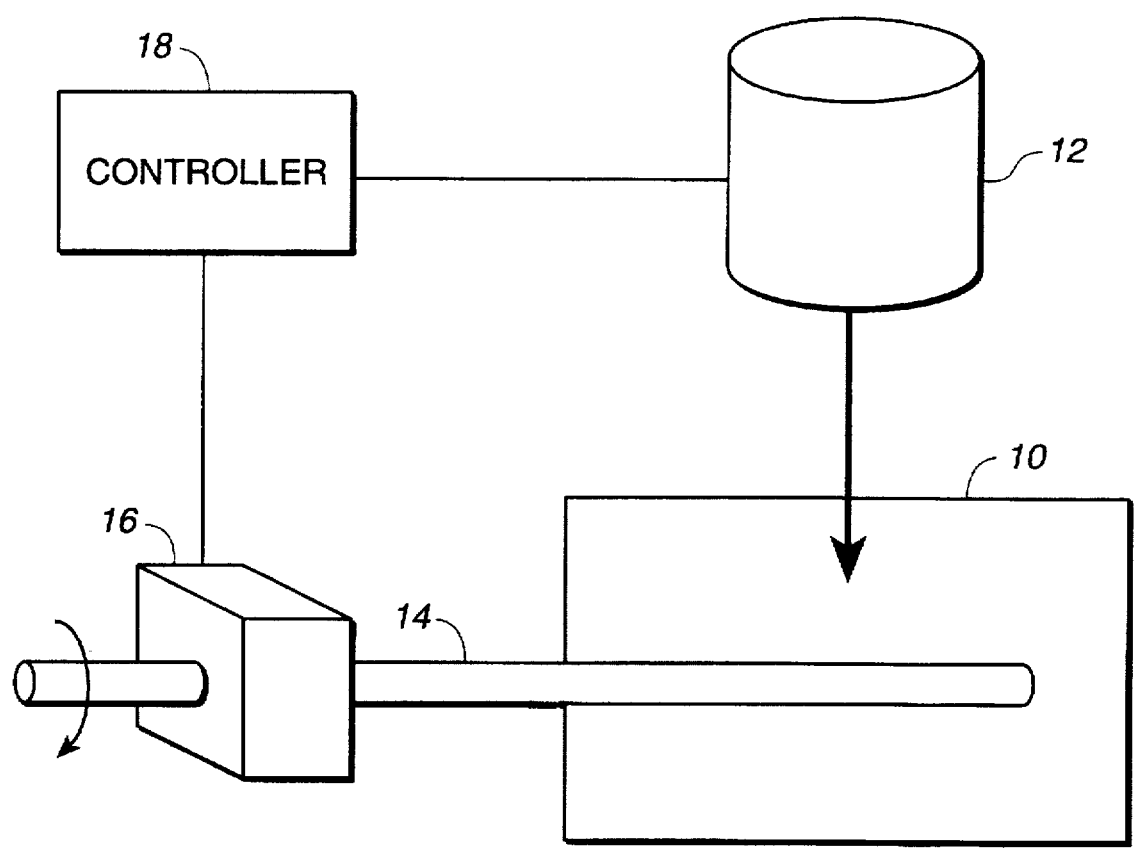
FIG._1

ROTATIONAL RESISTANCE CRYOGENIC CONTROL SYSTEM FOR CHILLING IN A VACUUM TUMBLER OR AGITATOR BLENDER

BACKGROUND OF THE INVENTION

1. Field of the Invention

The present invention provides a control method for determining the exact amount of cryogenic material such as liquid nitrogen or carbon dioxide "snow" required to be mixed into meat products in a cryogenic food mixing machine to freeze the meat until it is stiff enough to form efficiently. The inventive control system utilizes one or more methods to measure the viscosity of the product and turn off the flow of cryogenic when the proper viscosity or stiffness is reached.

2. Description of the Prior Art

There is a large market for meat patties and other meat shapes made out of many small whole muscle pieces of meat formed together. During the removal of meat from the bones of beef or chicken, many small pieces of flesh are generated. These small pieces have much less value than the large fillet pieces. However, when these small pieces are formed together into larger shapes, the value per pound of meat increases dramatically. In order to form the small pieces together and have them stick together until they are cooked, it is necessary to freeze part of the meat to make it stiff.

In industrial processing plants, the freezing of the whole muscle meat pieces is typically accomplished with carbon dioxide snow or liquid nitrogen spray inside of a twin agitator meat blender or vacuum tumbler, such as those described in U.S. Pat. No. 5,104,232 and U.S. Pat. No. 4,314,451 (the latter patent is directed to a $CO_2$ control system in a twin agitator blender, not in a tumbler).

Liquid $CO_2$ (used to make $CO_2$ snow) and liquid nitrogen are very expensive materials, typically costing 3 to 6 cents per pound. It normally takes more than one-half pound of cryogen to chill one pound of meat stiff enough to form it, therefore, the cost of cryogen is a significant part of the costs of producing a formed product. It is not uncommon for a processor to spend three or four hundred thousand dollars per year on cryogen to operate one chilling vacuum tumbler.

It is also not uncommon for a processor to waste 20% to 30% of the cryogen because they have no accurate way to control the amount used to get the product just stiff enough to form properly. The three known control methods are (1) chill time, (2) the sound of the product tumbling around inside the tumbler drum, or (3) the temperature of the product. None of these control methods is accurate.

The chill time method is not accurate because the flow rate of cryogen changes dramatically depending on how full the storage tank is. Depending on the point in the unloading cycle of the storage tank, the amount of cryogen injected into the tumbler can vary by 50% in a given time period.

The most widely used control method in industry today is to train the operator to recognize the sound the product makes tumbling inside the tumbler drum when it is the correct stiffness for forming. As the product starts to freeze, it begins to sound like gravel rolling around inside the drum. The problem with this method is it is left to the judgement of the operator which will vary from batch to batch depending on how diligent he or she is. The tendency is to chill a little more than necessary "to make sure". The result is wasting the expensive cryogen.

Finally, the temperature method is not accurate because it is only necessary to freeze 35–40% of the meat cells to get the product stiff enough to form. Since the temperature of the frozen cells is exactly the same as the temperature of the unfrozen cells, it is impossible to know the percentage of cells frozen by measuring the product temperature.

A second problem which exists with chilling with cryogens is that different products chill at different rates. In order to minimize the amount of cryogen used, it is necessary to evenly mix the cryogen into the product throughout the batch. All products do not mix the same and all tumbler designs do not mix the products the same. Therefore, the cryogen cannot be injected into all products at the same rate. If the cryogenic is injected too fast, it will over-freeze pockets in the batch creating "cold spots". If the cryogen injection is continued, these cold pockets become completely frozen using up excess cryogenic. A more efficient approach is to cycle the cryogenic flow on and off in a manner which allows the batch to chill evenly.

There is no known accurate way to determine the most efficient on/off cycle to chill the product at the most efficient rate. Cryogen usage and chill times could be reduced if a control system could be devised which would automatically cycle the cryogen on and off at the most efficient cycle to keep the product chilling at the most efficient rate.

All vacuum tumblers have vanes which rotate through the product causing a folding and stirring action. The energy it takes to rotate or push the vanes through the product depends on 1) the height and angle of the vane with the product flow, 2) the viscosity of the product, and 3) the depth of product in the tumbler drum. The configuration of the vane system is a constant for a given tumbler drum. If the batch size is held constant, the product viscosity is the only variable. Since the viscosity increases as the cells of the product freeze and the product becomes more stiff, it is possible to correlate the energy level needed to rotate the drum with the viscosity or stiffness of the product.

Unfortunately, the point where the energy level required to rotate the drum is the highest is not the same as the point where the product is stiff enough to form. As the cells of the product begin to freeze, the batch of product starts to break up into "balls". These "balls" of product then start to roll inside the drum. At this stage in the chilling process the energy required to rotate the drum begins to level off and then begins to decrease, but the product requires further chilling to be stiff enough to form.

SUMMARY OF THE INVENTION

The cryogenic control system of this invention measures rotational resistance in a cryogenic food mixing machine such as a vacuum tumbler or agitator blender to determine by test the length of time it takes from the start of chilling to reach the maximum energy level $T_{me}$, and the length of time it takes to chill the product to the desired forming point stiffness $T_f$, to establish a ratio $T_f/T_{me}$ for that product and batch size. This ratio can then be used for all further cycles, regardless of cryogenic flow rate, snowhorn efficiency, and the like, to determine the optimum product chilling point.

BRIEF DESCRIPTION OF THE DRAWINGS

FIG. 1 is a schematic view of a cryogenic food mixing machine having a cryogen input, a drive shaft connected to a rotational resistance measurement device, and a controller to regulate cryogenic flow.

DETAILED DESCRIPTION OF A PREFERRED EMBODIMENT

FIG. 1 is a schematic view of a cryogenic food mixing machine 10 having a cryogen input 12, a drive shaft 14 connected to a rotational resistance measurement device 16, and a controller 18 connected to both the cryogen input and rotational resistance measurement device to regulate cryogen flow in response to rotational resistance.

It has been determined that there is a fixed relationship between the length of time $T_{me}$ it takes for the mixing machine to reach the maximum energy level, and the length of time $T_f$ takes for the product to become adequately chilled for forming. This relationship is different for different products, but with the same product and same batch size the relationship stays the same batch after batch.

Since the flow rate of liquid cryogen changes from day to day depending on the tank, the length of chilling time to reach the maximum energy level changes from day to day also. However, from day to day, the length of time required to perfectly chill a standard batch of the same product is always the same multiple of the length of time required to reach the maximum energy level. It is, therefore, practical to devise a control system that measures the length of time to reach the maximum energy level and then multiply this time by a preprogrammed multiple to determine the precise chilling time to automatically turn off the cryogen.

The exact multiple of the time to reach the maximum energy level must be determined by test for a given product and batch size, but once determined it can be permanently programmed into the control system. Once programmed, the control system will accurately stop the flow of cryogen at the perfect chill point batch after batch, day after day.

The inventive method can thus be characterized as follows:

A method for controlling cryogen flow in a food mixing machine driven by a drive shaft including the steps of:
providing a first measured quantity of food product into the food mixing machine;
initiating mixing of the food product in the food mixing machine by rotation of the drive shaft and delivery of liquid cryogen onto the food product, and establishing a start time therefore;
measuring the rotational resistance to the drive shaft as the food product is chilled and the viscosity of food product is increased by the liquid cryogen until a maximum resistance is determined, and establishing an elapsed time $T_{me}$ from the start time therefore;
continuing mixing of the food product and delivery of the liquid cryogen onto the food product until the food product has achieved forming point stiffness, and establishing an elapsed time $T_f$ from the start time therefore;
subsequently operating the food mixing machine for a second measured quantity of food product generally equal to the first measured quantity;
measuring the rotational resistance to the drive shaft as the second measured quantity of food product is chilled by the liquid cryogenic until a maximum resistance is determined, and establishing an elapsed time $T_{me2}$ therefore; and
continuing mixing and chilling of the second measured quantity of food product for a total elapsed time $T_{f2}=T_{me2} \times T_f/T_{me}$.

The energy it takes to rotate the drum during chilling is very erratic from the time the chilling process starts until the maximum energy level is reached. The energy measurements vary up and down making it very difficult to identify when the maximum energy level is reached. The maximum energy level must be precisely and accurately identified batch after batch. There must be a repeatable, accurate measure of product stiffness for the control system to have value. The erratic variation of the energy measurements should preferably be smoothed out so they precisely follow the changes of stiffness of the product as it freezes.

This invention includes a method of smoothing out the energy measurements so the resulting energy curve accurately reflects the changing stiffness of the product. The most simple method of smoothing out the energy measurements is to record the energy level points very frequently (e.g., one each second) and average a large number of energy points together. By utilizing a rolling average of, e.g., 5–50 energy points, the resulting energy curve is smooth and repeatable.

Although the simple rolling average method works effectively, there are other more sophisticated mathematical methods that work also. These mathematical methods are designed to take a family of points which form a trend and mathematically determine the smooth curve which best fits that family of points. One such mathematical method is the "sum of the squares".

One the energy curve is smoothed out, the maximum energy level is relatively simple to identify. When the smoothed out energy curve levels out and ceases to increase for a definite period of time (say 10 seconds), the maximum energy level has been reached. This point closely correlates to the maximum viscosity of the product before it starts to break up into balls of partially frozen product.

In the early stages of chilling before any cells start to freeze, there is a period of time when the product viscosity does not change. During this period the energy level also does not change. In order to avoid having the control system misidentify this period as the maximum energy level, the system must be designed to not act on these non-increasing energy points.

The start time is recorded and the chilling elapsed time is accumulated by the controller. However, the energy level data is not acted upon during the first 50–70% of the chilling cycle. This is to make sure the system does not turn off the cryogen prematurely. After the product cells start to freeze, the energy level (and viscosity) constantly increase until the maximum energy level is reached.

To refine this control system even further, the rate of increase of the rotation energy level can be controlled so that the product increases in viscosity at a constant rate. This rate of increase of the product viscosity can be controlled by cycling on and off the flow of cryogen. The on/off cycle can be controlled to balance the freezing rate of the meat cells with the rate at which the cryogen can be efficiently mixed with the product to avoid frozen pockets in the batch.

This control system is not affected by the variables such as cryogen supply pressure, $CO_2$ snowhorn efficiency, or nitrogen nozzle efficiency which can vary from batch to batch. It will automatically adjust the on/off cycle of the cryogen to maintain the viscosity profile desired regardless of the process variables.

There are several methods for measuring the rotational energy level of a tumbler system which can be correlated with product stiffness. These methods are different depending on whether the tumbler is electrically driven or hydraulically driven:

1. Electrically driven tumblers
   a. A load sensing device which measures the consumption of electrical power by the tumbler system by sensing electrical current and voltage can be connected to the electrical drive motors. This power consumption has a direct correlation to the rotational energy level of the tumbler system.
   b. If the motors are controlled by a variable frequency controller, some of these controllers are equipped to measure the power consumption of the motors.

2. Hydraulically driven tumblers
   a. The pressure difference in the hydraulic lines connected to the inlet and outlet ports of the hydraulic motors can be measured. This pressure drop difference has a direct correlation to the rotational energy level of the tumbler system.
   b. If the hydraulically driven unit is connected to a central hydraulic system along with a variety of other machines, the tumbler hydraulic drive will see constant hydraulic pressure. In this case the rotational speed of the tumbler drum can be monitored. This speed has an inverse correlation to the rotational energy of the tumbler system.
3. Other
   a. With either electrically driven or hydraulically driven tumblers, a torque sensing device can be installed on any of the drive shafts which transmit power from the drive motors to the tumbler system. This torque sensor directly measures the rotational strain on the drive shaft. This rotational strain has a direct correlation to the rotational energy level of the tumbler system.

The above-described cryogenic control system is designed to be used with vacuum tumblers. U.S. Pat. No. 4,314,451 discloses a cryogenic control method for twin agitator mixers, and discloses the measurement of product resistance against the agitator mechanism to sense when the product stiffness reaches a point where the product can be properly formed. However, that disclosure does not take into consideration the possibility that the product resistance may not continuously increase as the product freezes. In other words, it assumes that the resistance curve continues to increase throughout the freezing of the cells in the latent heat of fusion zone. It has now been determined that, in fact, the product begins to break apart in the latent heat of fusion zone even with a twin agitator blender. This results in the resistance reaching a maximum and then leveling off or falling as more cells are frozen in this latent heat of fusion zone. Applying the same principles of the present disclosure will work better for twin agitator blenders as well as tumblers.

The ribbon agitator system is only one possible agitator configuration in a twin agitator blender. For example, a paddle agitator also provides proper agitation for a blender. Either the ribbon or the paddle agitators could be used to mix products for chilling for forming in accordance with this invention.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. A method for controlling cryogen flow in a food mixing machine driven by a drive shaft, said method comprising the steps of:

providing a first measured quantity of food product into said food mixing machine;

initiating mixing of said food product in said food mixing machine by rotation of said drive shaft and delivery of liquid cryogen onto said food product in said food mixing machine, and establishing a start time therefore;

measuring the rotational resistance to said drive shaft as said food product is chilled and the viscosity of said food product is increased by said liquid cryogen until a maximum resistance is determined, and establishing an elapsed time $T_{me}$ from said start time therefore;

continuing mixing of said food product and delivery of said liquid cryogen onto said food product until said food product has achieved forming point stiffness, and establishing an elapsed time $T_f$ from said start time therefore;

subsequently operating said food mixing machine for a second measured quantity of food product generally equal to said first measured quantity;

measuring the rotational resistance to said drive shaft as said second measured quantity of food product is chilled by said liquid cryogen until a maximum resistance is determined, and establishing an elapsed time $T_{me2}$ therefore; and continuing mixing and chilling of said second measured quantity of food product for a total elapsed time $T_{f2} = T_{me2} \times T_f / T_{me}$.

2. The method for controlling cryogen flow in a food mixing machine of claim 1 further including the step of mathematically averaging said rotational resistance measurements to define a smooth curve.

3. The method for controlling cryogen flow in a food mixing machine of claim 1 wherein said step of delivering liquid cryogen into said food product comprises cycling such delivery to achieve maximum efficient chilling of said food product.

4. The method for controlling cryogen flow in a food mixing machine of claim 1 wherein said food mixing machine comprises a vacuum tumbler.

5. The method for controlling cryogen flow in a food mixing machine of claim 1 wherein said food mixing machine comprises an agitator blender.

* * * * *